July 30, 1963  I. GOODBAR  3,099,195
CAMERA WITH LENTICULATED MASK
Filed Feb. 29, 1960  3 Sheets-Sheet 2

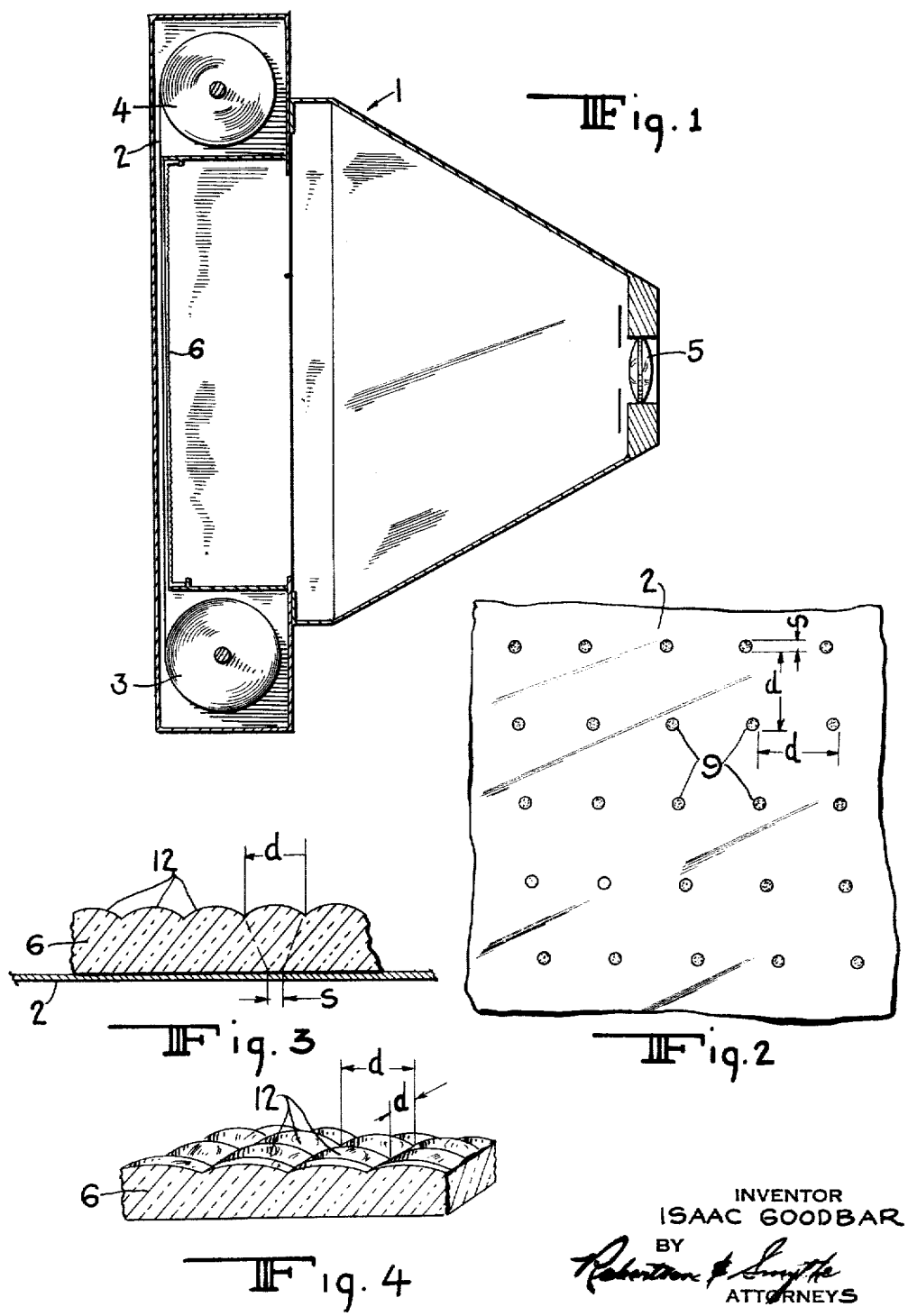

INVENTOR
ISAAC GOODBAR
BY
ATTORNEYS

July 30, 1963  I. GOODBAR  3,099,195
CAMERA WITH LENTICULATED MASK
Filed Feb. 29, 1960  3 Sheets-Sheet 3
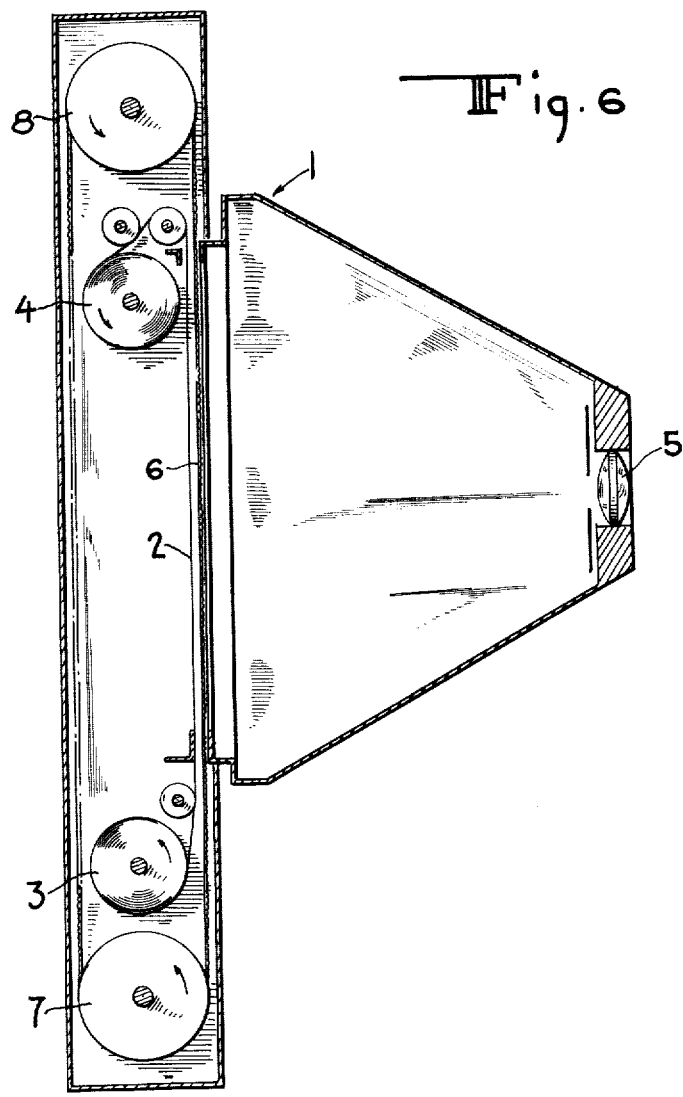
INVENTOR
ISAAC GOODBAR
BY
ATTORNEYS

United States Patent Office 3,099,195
Patented July 30, 1963

3,099,195
CAMERA WITH LENTICULATED MASK
Isaac Goodbar, 93—02 211th St.,
Queens Village 28, N.Y.
Filed Feb. 29, 1960, Ser. No. 11,797
1 Claim. (Cl. 95—37)

The invention relates to photographic cameras as utilized in both picture-taking and picture-viewing devices for still and motion pictures.

One of the most fundamental problems in photography is that of obtaining adequate illumination of the subject or viewing screen as the case may be. In taking the picture, low illumination of the subject has been compensated for by fast lenses and high speed film or by supplementary lighting with various forms of artificial illumination. High speed lenses are costly and flood lighting equipment is cumbersome. In the case of viewing screens, environment lighting is always a problem and high intensity lighting with elaborate lens systems are required to overcome this according to present day practice.

According to my invention these problems are substantially met in a quite simple and inexpensive way through the use of a lenticulated mask and adjacent screen element which form an array of dots comprising tiny fragments of the image. When viewed from a distance, these image fragments collectively reproduce the appearance of the object photographed. Such a substitution of a fragmented image is well known in the art of printing halftone images by the screen process, and has heretofore been proposed in photography where, however, the substitution has been obtained by interposing perforated masks of opaque material that obstructs a great part of the light. The device which forms the object of the present invention achieves this substitution not by obstructing but, instead, by redirecting most of the light into the desired small pinpoint areas.

My invention is applicable to both picture-taking and picture-viewing equipment, so in describing the invention generally I shall employ the term "camera" in its generic meaning together with other terms of art capable of being understood as applicable equally to the lens of a camera for taking pictures and to the luminous source of light of a picture projector or viewer; or to the light sensitive photographic film used in the former and as well to the finished negative or positive transparency used in the latter. So understood, my invention in apparatus for photographic reproduction of fractional pictures or images comprises a camera chamber, means arranged toward one end of the camera chamber for distributing light from a concentrated area or point, a lenticulated mask spaced from the point of light distribution and arranged toward the end of the camera chamber, and means for supporting a photographic film element adjacent the lenticulated mask. The lenticular surface of the mask consists of a multiplicity of tiny lenses for re-concentrating the light in a large number of minute fragments which when viewed from a distance collectively reproduce the appearance of the object photographed. The lenticular mask and adjacent photographic film element can be utilized in conjunction with the motion picture apparatus described and claimed in my prior Patent No. 2,943,533, granted July 5, 1960. The lenticular mask itself is disclosed, but not claimed, in my prior application for patent, Serial No. 607,108, filed August 30, 1956, now abandoned, whereof the present application is a continuation in part. The mask is essentially a plate or ribbon of transparent material whose index of refraction is substantially higher than air. Its lenticulated surface may be formed by molding, or otherwise.

Through the use of my invention it becomes possible to take still or motion pictures with much lower illumination than was hitherto required, and to view the pictures under conditions of higher environmental illumination or lower projection illumination.

With reference to the accompanying drawings, I shall now describe the best mode known to me for carrying out my invention.

FIG. 1 is a diagrammatic vertical sectional view of a still camera embodying my invention.

FIG. 2 shows a fragment of an exposed and developed negative or positive transparency, highly magnified.

FIG. 3 is a cross sectional view of a fragment of the lenticular mask and adjacent photographic film element, also high magnified.

FIG. 4 is a perspective view of the mask fragment of FIG. 3.

FIG. 6 is a diagrammatic vertical sectional view showing the application of my present invention to the motion picture camera of my prior patent aforesaid.

Figure 5:
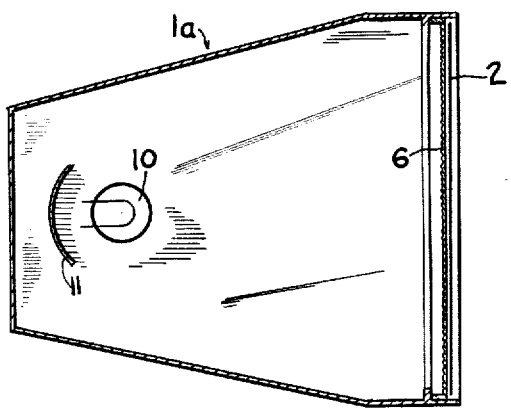
FIG. 5 is a diagrammatic cross sectional view of a viewing device constructed according to my invention.

Referring to FIGS. 1, 5, 6 and 7, my invention comprises, in apparatus for photographic reproduction of fractional pictures, a camera chamber 1, 1$^a$ or 1$^b$, means arranged toward one end of the camera chamber for distributing light from a concentrated point (lens 5 of FIGS. 1 and 6, or light bulb 10 and reflector 11 of FIGS. 5 and 7), a lenticulated mask 6 spaced from said point of light distribution and arranged toward the opposite end of the camera chamber, and means such as the spools 3, 4, e.g., for supporting a photographic film element 2 adjacent the lenticulated mask. The lenticulated surface of the mask 6 consists of a multiplicity of tiny lenses 12 for re-concentrating the light in a large number of tiny spots 9, FIG. 2. The mask may be a plate, FIGS. 1 and 5, or a flexible ribbon carried on guide rollers 7, 8, FIGS. 6 and 7. The lenses 12 may be so small as to be thought of almost as microscopic so that the surface appears as a matte to the eye. Suitable motor and drive mechanism is provided to transport the film 2 and mask 6 in the motion picture camera of FIG. 6 and viewer of FIG. 7, the film and mask being driven at different relative speeds in accordance with my prior Patent No. 2,943,533 aforesaid.

The lenses 12 of the mask are preferably substantially spherical, and may be either concave or convex as shown. They are designed so that they will, approximately, produce an image 9, FIG. 2, of size $s$, FIGS. 2 and 3, on the photographic film element 2, when the mask is appropriately located.

The distance $d$ between two of the images, or dots 9, must be substantially equal to the minimum detail to be discerned on the exposed image. The size $s$ will change depending upon the opening of the iris diaphragm of the objective lens 5. If the adjustments for different brightness are made by changes of exposure time or by proper filters, the size $s$ of the dot may be maintained constant.

Since all that is desired is the concentration of the light on the dots, it is not critical for the image of the objective lens to be focussed exactly on the surface of the light sensitive material, the most important point being to obtain concentration of the light.

As all the light falling on an area $d^2$ is concentrated on an area substantially equal to $$\frac{\pi s^2}{4}$$

if, without the mask 6, a certain illumination $E_0$ was required for a satisfactory exposure, with the mask 6 the illumination required will be:

$$E_m = \frac{s^2}{4\eta d^2} \times E_0$$

where $\eta$ is the proportion of light transmissed through the mask and $\pi$ is approximately 3.1416.

To clarify this a practical example will be considered.

If
$$d = 0.2 \text{ millimeter}$$
$$s = 0.02 \text{ millimeter}$$

and
$$\eta = 0.80$$

$$E_m = \frac{\pi E_0}{4 \times 100 \times 0.80} \simeq \frac{E_0}{102}$$

this means that if, without use of my apparatus, a picture was possible outdoors with an illumination of the order of 10,000 lumens per square meter, the same picture will be possible indoors with an illumination of only 100 lumens per square meter when my invention is used. This avoids the necessity of any auxiliary source of illumination, such as flash-bulbs, for instance.

If the mask is made in the shape of a long ribbon, preferably endless, and both the mask and the film are moved at different speeds, by means of the camera shown in FIG. 6, it will be possible to produce motion pictures indoors without the use of cumbersome flood lighting with its discomfort to performers.

If the still film 2 exposed in the camera shown in FIG. 1 is placed in front of the viewing device shown in FIG. 5 with the mask 6 near it and a light source 10, of dimensions comparable to those of the objective lens, and located in the same relative position previously occupied by the objective lens, the images of the light source will be formed where the images of the objective lens were previously formed.

The exposed dots 9 will, therefore, be the only parts strongly illuminated. The rest of the film, which was not exposed, will be very dark and will reflect very little environment lighting. This will make the images clearly visible, even in strongly lighted environments. By means of small changes in the location of the source 10, it is possible to compensate for changes in dimensions which may have taken place during processing of the film.

Figure 7:
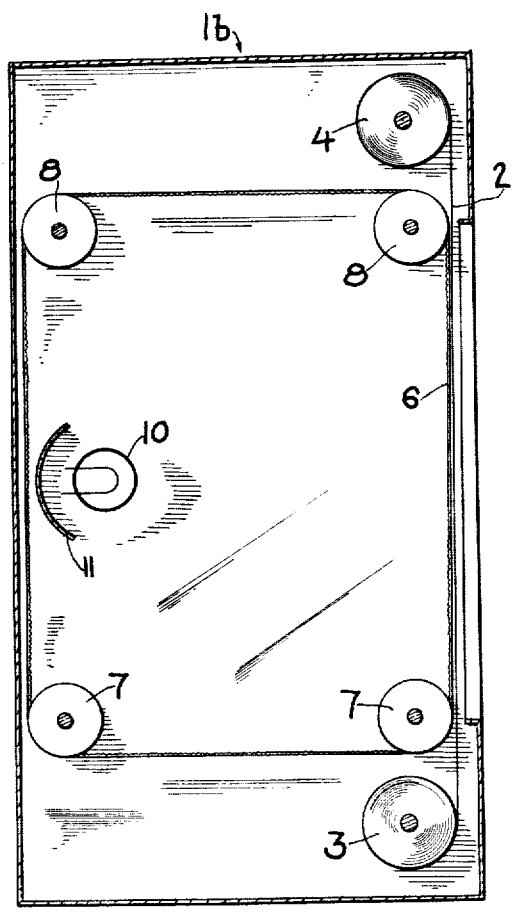
FIG. 7 is a diagrammatic vertical sectional view of a device for viewing motion pictures taken with the camera of FIG. 6.

Similarly, animated scenes photographed with a device such as shown in FIG. 6, can be viewed in a device as shown in FIG. 7, where, also, the luminous source 10 occupies the same relative position previously occupied by the lens 5. In this case also, changes in the location of the source 10 make it possible to correct for changes in dimensions that may have taken place during processing of the film.

The terms and expressions which I have employed are used in a descriptive and not a limiting sense, and I have no intention of excluding such equivalents of the invention described as fall within the scope of the claim.

I claim:

An apparatus for photographing a succession of pictures comprising a enclosure having an image aperture positioned therein, an objective lens disposed in a wall of said enclosure and spaced from said image aperture, film spools disposed above and below said image aperture to support a photographic film, means for guiding said film across said image aperture intermediate said spools, an endless lenticulated scanning mask mounted with a portion of the lenticulated scanning mask passing across said image aperture juxtapositioned adjacent the film on the side toward the lens, said lenticulated mask consisting of a multiplicity of tiny lenses and a means for moving said film and lenticulated scanning mask across said image aperture at different relative speeds, the difference in speed between the film and lenticulated scanning mask being $s/e$ where $s$ is the dimension of the image of the objective lens produced on the film by each of the lenses of the lenticulated scanning mask and $e$ is the film exposure time.

References Cited in the file of this patent

UNITED STATES PATENTS

| | | |
|---|---|---|
| 1,260,682 | Kanolt | Mar. 26, 1918 |
| 1,875,244 | Keen | Aug. 30, 1932 |
| 1,930,228 | Draper | Oct. 10, 1933 |
| 1,935,471 | Kanolt | Nov. 14, 1933 |
| 2,063,985 | Coffey | Dec. 15, 1936 |
| 2,566,110 | Backus | Aug. 28, 1951 |
| 2,596,740 | Tuttle | May 13, 1952 |
| 2,622,472 | Bonnet | Dec. 23, 1952 |
| 2,724,312 | Gruetzner | Nov. 22, 1955 |

FOREIGN PATENTS

| | | |
|---|---|---|
| 944,261 | France | Nov. 2, 1948 |

OTHER REFERENCES

Article, "Improvements in High-Speed Motion Pictures by Multiple-Aperture Focal-Plane Shutter," Journal, Society of Motion Picture Engineers, vol. 53, pages 462–468, November 1949.

UNITED STATES PATENT OFFICE
CERTIFICATE OF CORRECTION

Patent No. 3,099,195                            July 30, 1963

Isaac Goodbar

It is hereby certified that error appears in the above numbered patent requiring correction and that the said Letters Patent should read as corrected below.

Column 2, line 14, for "high" read -- highly --; column 3, lines 3 to 5, in the equation, before "$s^2$" insert -- $\pi$ --; line 6, for "transmissed" read -- transmitted --.

Signed and sealed this 7th day of July 1964.

(SEAL)
Attest:

ERNEST W. SWIDER                            EDWARD J. BRENNER
Attesting Officer                                Commissioner of Patents